(12) United States Patent
Gruenwald

(10) Patent No.: US 6,630,648 B2
(45) Date of Patent: Oct. 7, 2003

(54) DEVICE FOR DISPENSING OF HYDROGEN

(75) Inventor: Werner Gruenwald, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/074,452

(22) Filed: Feb. 11, 2002

(65) Prior Publication Data

US 2002/0125267 A1 Sep. 12, 2002

(30) Foreign Application Priority Data

Feb. 9, 2001 (DE) .......................... 101 05 895

(51) Int. Cl.[7] .................. H01M 8/12; H01M 8/14; H01M 8/22; F27B 5/02; F27B 5/14
(52) U.S. Cl. .................. 219/385; 219/202; 429/20; 222/146.5
(58) Field of Search ................. 219/385, 201, 219/202; 429/20; 222/3, 6, 146.5

(56) References Cited

U.S. PATENT DOCUMENTS 5,366,820 A * 11/1994 Tsutsumi et al. ............. 429/20
5,746,985 A * 5/1998 Takahashi .................... 429/20
6,530,233 B1 * 3/2003 Nakamura et al. .......... 219/201

FOREIGN PATENT DOCUMENTS

DE 1952397 * 8/1996

* cited by examiner

Primary Examiner—Joseph Pelham
(74) Attorney, Agent, or Firm—Kenyon & Kenyon

(57) ABSTRACT

A device for dispensing hydrogen, in particular for supplying gaseous hydrogen for a fuel cell, has a reservoir, a gas connection for removing hydrogen from the reservoir and at least one heating device with which the reservoir is heatable for dispensing hydrogen. In addition, the reservoir is subdivided into at least two modules which are heatable independently of one another.

11 Claims, 1 Drawing Sheet

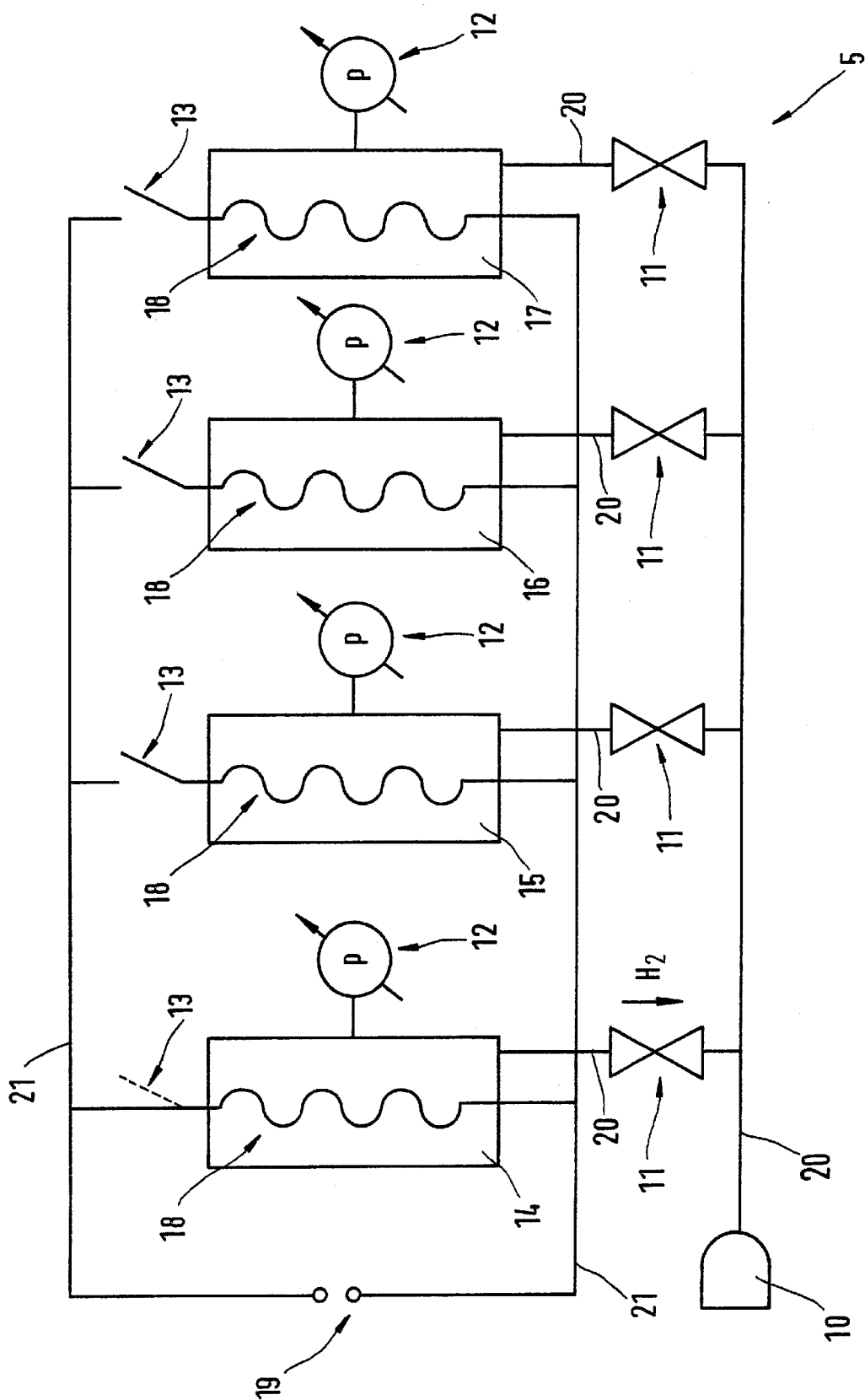

DEVICE FOR DISPENSING OF HYDROGEN

FIELD OF THE INVENTION

The present invention relates to a device for dispensing of hydrogen, in particular for supplying gaseous hydrogen for a fuel cell.

BACKGROUND INFORMATION

Metal hydride storage devices in which the actual storage material is usually magnesium or nickel are known for temporary storage of hydrogen. To unload hydrogen stored in such a metal hydride storage device, it is usually heated to a temperature of approximately 300° C. In addition, because of the required heat management in loading and unloading with hydrogen due to the heat of adsorption and desorption, the storage material is often embedded in an uninterrupted aluminum foam structure.

In addition to metal hydride storage devices for hydrogen, there are also known cryostorage devices in which cooled, liquefied hydrogen is stored at temperatures of around 20 K; there are also known carbon nanostorage devices, storage devices based on glass microbeads and traditional gas pressure tanks for hydrogen.

An object of the present invention is to provide a device for dispensing hydrogen which would have an improved energy efficiency in comparison with that known in the related art and would also consume less energy in heating the device to the required operating temperature in comparison with the related art.

SUMMARY OF THE INVENTION

The device according to the present invention for dispensing hydrogen has the advantage over the related art that due to the modular design, the entire device need not be heated constantly or completely each time in heating to the operating temperature of 300° C., for example, for dispensing hydrogen.

Thus, in heating conventional metal hydride storage devices, approximately 4% of the energy content of the full hydrogen storage device is consumed in each heating operation, so that these systems have a very poor energy efficiency on the whole. Furthermore, due to the large mass of the known storage devices to be heated, in particular when they are used to supply gaseous hydrogen for a fuel cell in a motor vehicle, a longer waiting time is necessary with a cold start, leading to an unacceptable impairment in operation of a motor vehicle.

The device according to the present invention, however, drastically reduces the energy consumption in heating to the operating temperature and shortens the required waiting time with a cold start.

In addition, the device according to the present invention for delivering hydrogen also offers considerable advantages in comparison with conventional cryostorage devices with regard to energy efficiency, because cryostorage devices need approximately 40% of the energy of the stored hydrogen for constant cooling of the hydrogen to approximately 20 K, and in addition approximately 1% to 2% of the stored hydrogen evaporates per day with such a storage device. Therefore, because of the wide ignition range of hydrogen, it is impossible to park vehicles equipped with a cryostorage device in a garage or a multistory parking garage.

In contrast to carbon nanostorage devices, the device according to the present invention has the advantage that the storage capacity is greatly increased, while also having the advantage of a significantly more rapid release of gas in comparison with storage of hydrogen with the help of glass microbeads.

In particular, due to the fact that the gas reservoir of the device according to the present invention is subdivided into multiple modules, each being heatable independently of the others, this yields the result that only a small partial area of the reservoir need be heated to provide the hydrogen instantaneously required in operation of this device. Furthermore, due to the smaller mass of the hydrogen to be heated, preferably in just one module at first, with the device according to the present invention, the required hydrogen is available practically immediately even with a cold start of a motor vehicle.

It is especially advantageous if the individual modules are designed like previously known metal hydride storage devices and preferably contain magnesium and nickel as the metal which stores hydrogen in the form of a metal hydride. In addition, it is advantageous if these individual modules, in accordance with the known metal hydride storage devices, have a foam structure, in particular an aluminum foam structure in which the metal storing the hydrogen temporarily is embedded.

BRIEF DESCRIPTION OF THE DRAWING

The FIGURE shows a schematic diagram of a device for dispensing hydrogen having a reservoir containing four modules.

DETAILED DESCRIPTION

The FIGURE shows a storage device 5 for dispensing hydrogen from a reservoir of the storage device, the reservoir being fillable with hydrogen through a gas connection 10, and hydrogen also being removable from storage device 5 or the reservoir through gas connection 10.

Storage device 5 has in particular four storage modules 14, 15, 16, 17, all of which are preferably designed similarly. However, it should be emphasized that individual modules 14, 15, 16, 17 may also have a different storage capacity, as needed, e.g., a low hydrogen storage capacity of first module 14 to make hydrogen available rapidly with a cold start or for short-distance trips, while other modules 15, 16, 17 then, for example, have a greater storage capacity for supplying a fuel cell integrated into a motor vehicle so that they may also ensure longer-term operation of the motor vehicle.

The FIGURE also shows how individual modules 14, 15, 16, 17 are connected to gas connection 10 via gas lines 20, a valve 11 being provided between each of modules 14, 15, 16, 17 and gas connection 10, so that individual modules 14, 15, 16, 17 are connectable to the gas connection, so that it is possible for gas to pass through them by way of a control unit (not shown) which is connected to valves 11. The control unit is used in particular to open and close valves 11, as needed. In addition, the FIGURE also shows that each of modules 14, 15, 16, 17 has a pressure gauge device 12 with which the amount of hydrogen contained in respective module 14, 15, 16, 17 is determinable, preferably as a function of time, on the basis of the pressure measured in the respective module 14, 15, 16, 17.

Finally, the FIGURE shows that each module 14, 15, 16, 17 has a heating unit 18, which is known per se, e.g., an electric heater integrated into individual modules 14, 15, 16, 17 or surrounding them at least in some areas, e.g., in the form of heating conductors. Heating units 18 of the individual modules are connected to a power supply 19 by way of switches 13 and electric lines 21, so that by operation of switches 13 over the above-mentioned control unit (not shown), individual modules 14, 15, 16, 17 are heatable by heating units 18 independently of one another.

Individual modules 14, 15, 16, 17 preferably each contain a metal, in particular magnesium or nickel, with which hydrogen may be stored temporarily in the form of a metal hydride. In addition, this metal (hydride) is preferably embedded at least in a foam structure, in particular an aluminum foam structure.

In operation of storage device 5, first module 14 is heated first to an operating temperature of 300° C., for example, by way of the control unit and respective heating device 18, so that this module 14 delivers in gaseous form the hydrogen stored in the form of a metal hydride. To do so, it is provided that with the help of pressure gauge device 12, the operating state of first module 14 and the gas pressure in first module 14, i.e., specifically the amount of hydrogen still present in this module 14, are determinable. After first module 14 has been heated to the operating temperature of 300° C., then respective valve 11 is opened by the control unit, so that escaping hydrogen is available in gaseous form at gas connection 10.

As soon as it is ascertainable via pressure gauge device 12 that the hydrogen stored in first module 14 is running low, heating of subsequent second module 15 via heating device 18 assigned to it is triggered by the control unit, preferably so that this heating overlaps slightly in time with the heating of first module 14, and when the hydrogen stored in first module 14 is depleted, hydrogen is immediately available from subsequent second module 15. To do so, valve 11 which is provided for this module 15 is then opened, and valve 11 provided for first module 14 is closed. Accordingly, to heat second module 15, switch 13 assigned to it is also closed by the control unit, while after depletion of first module 14, heating of first module 14 is interrupted by opening of switch 13 assigned to it. Additional modules 16 and 17 are then heated accordingly.

Moreover, gas connection 10 may also be connected to a group of modules 14, 15, 16, 17 or to the totality of modules 14, 15, 16, 17 as needed by heating all modules 14, 15, 16, 17 at the same time by way of the control unit and opening all valves 11 at the same time. However, this is necessary only in exceptional cases.

Finally, heating of individual modules 14, 15, 16, 17 may also be accomplished by another method as an alternative to the electric heating described here.

A preferred means of regulating the heating power of individual heating units 18 and in addition the quantities of heat delivered by them may be accomplished by measuring the hydrogen pressure in individual modules 14, 15, 16, 17 with the help of pressure gauge device 12 as well as with the aid of 300° C. PTC resistance elements assigned to individual modules 14, 15, 16, 17. The PTC resistance elements are provided in particular for heating individual modules 14, 15, 16, 17 to a predetermined setpoint temperature by way of the control unit and stabilizing them at this temperature during the release of hydrogen.

In summary, the amount of hydrogen removable from storage device 5 per unit of time is thus regulatable through the control unit and heating units 18 and/or pressure gauge devices 12. To do so, the control unit regulates the heating power over heating devices 18 on the one hand while on the other hand connecting the modules individually or in groups to gas connection 10 through valves 11, depending on the amount of hydrogen still present in individual modules 14, 15, 16, 17.

In conclusion, it should also be pointed out that instead of pressure gauge devices 12, it is also possible to use other components with which the amount of hydrogen contained in or added to individual modules 14, 15, 16, 17 may be determined.

What is claimed is:

1. A device for dispensing hydrogen, comprising:

a reservoir;

a gas connection for removing hydrogen from the reservoir; and at least one heating device for heating the reservoir for dispensing the hydrogen;

wherein the reservoir is subdivided into at least two modules which are heatable independently of one another.

2. The device according to claim 1, wherein the modules contain a metal with which the hydrogen is temporarily storable in the form of a metal hydride in the modules, the metal being one of magnesium and nickel.

3. The device according to claim 2, further comprising an aluminum foam structure in which the metal is at least largely embedded.

4. The device according to claim 1, further comprising a pressure gauge device for determining an amount of hydrogen contained in at least one of the modules, as a function of time.

5. The device according to claim 1, further comprising a common gas connection and a gas line connecting the modules to the common gas connection through which at least one of (a) hydrogen is removable from the modules and (b) hydrogen is introduceable into the modules.

6. The device according to claim 5, further comprising a control unit and at least one valve operable by the control unit, the control unit and the at least one valve connecting the modules to the gas connection, in a manner allowing gas to flow, in order to remove or add gas.

7. The device according to claim 1, wherein the at least two modules include three to ten modules of the same kind, capable of storing a total of more than 2 kg hydrogen.

8. The device according to claim 6, wherein the at least one heating device includes an electric heating device by which the modules are heatable through the control unit individually one after another, with at most some overlapping in time.

9. The device according to claim 6, wherein the at least one heating device has PTC resistors, with which the modules are heated by the control unit to a preselected setpoint temperature of 300° and are stabilized at the temperature while the hydrogen is being dispensed.

10. The device according to claim 6, further comprising valves for connecting the modules to the gas connection, using the control unit, as a function of a quantity of hydrogen needed per unit of time and a quantity of hydrogen still present in the modules.

11. The device according to claim 1, wherein the device is for supplying gaseous hydrogen for a fuel cell.

* * * * *